Patented May 4, 1948

2,440,869

UNITED STATES PATENT OFFICE 2,440,869

CATALYTIC DESTRUCTIVE HYDROGENATION

Charles W. Montgomery, Oakmont, Joseph Burns McKinley, Pittsburgh, and Victor J. Anhorn, Oakmont, Pa., assignors to Gulf Research & Development Company, Pittsburgh, Pa., a corporation of Delaware No Drawing. Application April 5, 1946,
Serial No. 659,864

4 Claims. (Cl. 196—53)

This invention relates to catalytic destructive hydrogenation and more particularly to improved catalysts for the destructive hydrogenation of heavy petroleum residues.

The undistilled residue from cracking stills, commonly called pressure still tar, is of less value than distillate products such as gasolines, reforming stocks or cracking stocks. Thus it is desirable to convert heavy petroleum residues such as pressure still tar to these products and particularly to gasolines. One method of utilizing pressure still tar has been to subject it to a coking distillation whereby it is converted principally to gas, gasoline, gas oil and coke. Another method of disposing of pressure still tar is to reduce its viscosity by the addition of gas oil to convert it to a more marketable fuel oil. Still another method which may be used to utilize pressure still tar is to subject it to destructive hydrogenation. If sufficient hydrogen is caused to enter into reaction with the tar, polymerization reactions, which normally yield coke, are suppressed and the tar can be converted almost entirely into gasoline and gas with the former predominating. In order to cause sufficient hydrogen to be consumed in the reaction it is necessary to use a catalyst.

Many catalysts have been used for destructive hydrogenation. As examples may be mentioned metals of the sixth group of the periodic table such as molybdenum, chromium, tungsten, or uranium or mixtures thereof or compounds of these substances such as the sulfides or oxides. Stannous sulfide has been found particularly effective for some destructive hydrogenations, especially when employed with iodoform. Comminuted metals such as zinc, lead or tin with halogens, hydrogen halides, or halogen containing substances also have been used. Often substances active for destructive hydrogenation have been impregnated on carriers, among which have been mentioned aluminum silicate, pumice, siliceous naturally occurring earths, and alumina.

It is an object of the present invention to provide an improved process for the catalytic destructive hydrogenation of petroleum residues.

It is a further object of the present invention to provide a process for the catalytic destructive hydrogenation of petroleum residues by the use of an improved catalyst.

These and other objects of the present invention are attained by a process for catalytic destructive hydrogenation of petroleum residues by the use of a synthetic hydrated magnesium silicate-calcium silicate compound impregnated with molybdenum oxide.

The hydrated synthetic magnesium silicate-calcium silicate compound is produced by the reaction of a hot solution of a magnesium salt of a strong acid upon calcium silicate for a time sufficient to effect only a partial conversion of the calcium silicate to magnesium silicate. The material is more specifically described in U. S. Patent No. 2,163,525 to Lyle Caldwell.

The completed catalyst according to our invention was prepared in a preferred example by adding with stirring 583 parts of powdered synthetic hydrated magnesium silicate-calcium silicate compound which had been dried at 300° C. to a solution prepared by dissolving 368 parts of ammonium paramolybdate $(NH_4)_6Mo_7O_{24}.4H_2O$ in 1789 parts of distilled water plus 211 parts of concentrated ammonium hydroxide solution. After filtering the resulting slurry and weighing the wet cake it was noted that 1394 parts of solution had been absorbed. The catalyst cake was dried at about 105° C. for twenty hours and calcined by heating in air to about 550° C. The cooled product was allowed to absorb moisture from the air and was dried at 125° C. for one hour. The analysis showed that the catalyst as prepared contained 15.3 per cent by weight of molybdenum which was present in the form of oxides, predominantly the trioxide. This amount of molybdenum when calculated as the trioxide is equivalent to about 23 per cent by weight of the catalyst.

The preferable process of catalytic destructive hydrogenation in which this catalyst may be used is a suspensoid process. The process is a continuous one in which the petroleum residue, hydrogen, recycle tarry residue and the finely divided catalyst in suspension are pumped to a conversion zone such as a coil or reaction chamber where they are subjected to a temperature in the range 800° to 950° F. and preferably 850° to 900° F. and a pressure in the range 1000 to 3000 pounds per square inch and preferably 2000 pounds per square inch for a period of time sufficient to cause substantial destructive hydrogenation. The product of the conversion is passed to a separating zone where the gases are taken off, including hydrogen which may be recovered. The residue from the separating zone, still containing catalyst, is sent to a tar stripper where the tar or other heavy residuum is taken out together with the catalyst and recycled. The overhead from the tar stripper is passed to a fractionator where the gasoline-like hydrocarbons are removed and condensed and from which any heavier oil is also recycled. The process involves recycling to extinction, that is, to gasoline and gas.

For purposes of testing the catalyst prepared in the manner described above, 168.2 parts (by weight) of pressure still tar were charged to a stainless steel bomb. Distillation analysis of the tar showed that it contained 0.6 weight per cent of gasoline boiling to 180° F. at 10 mm. pressure (390° F. at 760 mm. pressure), 22.6 weight per cent of gas oil boiling from 180° F. at 10 mm. to 369° F. at 5 mm. pressure, and 76.8 weight per cent of residual material. To the tar was added 7.66 parts of the catalyst, which was ground to pass through a 200 mesh sieve and which was dried for one hour at about 125° C. The bomb was pressured with 8.55 parts of hydrogen, an initial pressure at room temperature of about 940 p. s. i. g. resulting. The bomb was introduced into a rocking electric furnace, heated to 850° F., maintained at this temperature for a calculated period of time, and then cooled rapidly to room temperature. The pressure at reaction temperature averaged 2030 p. s. i. g. Assuming that the rate of the destructive hydrogenation doubles for a temperature rise of about 25° F., the actual reaction time at 850° F. was corrected for heating and cooling periods and was found to be equivalent to 60–61 minutes at 850° F. Gaseous, liquid, and solid products were recovered from the bomb. The gas was analyzed by low temperature fractionation, absorption, and combustion techniques. The analysis indicated that 2.37 parts of hydrogen were consumed in the reaction and that the reaction yielded 7.0 parts of hydrocarbon gas ($C_4$ and lighter). The non-gaseous product was separated by distillation and the solvent action of benzene into 23.8 parts of gasoline, 59.6 parts of gas oil, 72.5 parts liquid residue, and 8.71 parts of benzene insolubles (coke and catalyst). The liquid cuts had the same boiling ranges which are indicated above for similar fractions of the charge stock. Assuming that the catalyst portion of the benzene insolubles was equal in amount (7.66 parts) to the catalyst charge, the amount of coke formed was found by difference to be 1.05 parts. Summarized results of this experiment (run No. 2) are shown in the table.

Other runs discussed below were made in an identical manner. Data relative to products obtained have been corrected from actual yields, such as given above, to 100 weight per cent recovery based on the pressure still tar charged plus the hydrogen consumed in the runs. Run 1 was a destructive hydrogenation in the absence of catalyst and run 3 was made using a similar amount of synthetic calcium silicate-magnesium silicate, as was used as carrier for the molybdenum trioxide in run 2, alone. Run 4 utilized a similar weight percentage of molybdenum trioxide as was employed in run 2 but the support was talc (naturally occurring material of similar composition to synthetic calcium silicate-magnesium silicate). This catalyst was prepared in a manner substantially identical to that utilized in preparing the molybdenum trioxide-synthetic calcium silicate-magnesium silicate. Although it contained only 15.4 weight per cent of molybdenum trioxide as compared with the 23.0 weight per cent molybdenum trioxide of the Magnesol catalyst, it was ground to pass through a 325 mesh sieve to enhance its catalytic activity, if possible, over that of the molybdenum trioxide-synthetic calcium silicate-magnesium silicate which was only ground to pass through a 200 mesh sieve.

TABLE

*The destructive hydrogenation of pressure still tar for 60–61 equivalent minutes at 850° F. under 2200±200 average p. s. i. g.*

| | Charge | Run No. 1 | Run No. 2 | Run No. 3 | Run No. 4 |
|---|---|---|---|---|---|
| Charge to Bomb: | | | | | |
| Tar, parts | | 175.3 | 168.2 | 175.5 | 175.5 |
| Molybdenum Trioxide, parts (by weight) | | none | 1.76 | none | 1.77 |
| Catalyst Carrier— | | | | | |
| Synthetic calcium silicate-magnesium silicate, parts (by weight) | | none | 5.90 | 6.10 | none |
| Talc, parts (by weight) | | none | none | none | 9.73 |
| Hydrogen, parts (by weight) | | 8.60 | 8.55 | 8.63 | 8.55 |
| Pressure at Reaction Temperature: | | | | | |
| Initial, p. s. i. g. | | 2280 | 2070 | 2260 | 2130 |
| Final, p. s. i. g. | | 2410 | 1990 | 2400 | 2140 |
| Products (Weight Per cent of Tar Charged Plus $H_2$ Consumed): | | | | | |
| $C_4$ and Lighter | | 8.5 | 4.3 | 9.3 | 6.0 |
| Gasoline | 0.6 | 18.7 | 14.5 | 18.7 | 14.0 |
| Gas Oil | 22.6 | 31.9 | 36.4 | 29.8 | 31.6 |
| Liquid Residue | 76.8 | 36.5 | 44.2 | 38.8 | 48.0 |
| Coke | | 4.4 | 0.6 | 3.4 | 0.4 |
| Total | 100.0 | 100.0 | 100.0 | 100.0 | 100.0 |
| Properties of Products: | | | | | |
| Gasoline— | | | | | |
| Sp. Gr. at 60°/60° F. | | 0.745 | 0.752 | 0.743 | 0.742 |
| Per cent Paraffins and Naphthenes | | 74.5 | 77.4 | 78.5 | 65.9 |
| Per cent Olefins | | 14.1 | 8.1 | 13.6 | 22.0 |
| Per cent Aromatics | | 11.4 | 14.5 | 7.9 | 12.1 |
| Gas Oil, Sp. Gr. at 60°/60° F. | | 0.9224 | 0.8844 | 0.9273 | 0.9206 |
| Tar, Sp. Gr. at 210°/60° F. | | 1.0647 | 0.9441 | 1.0760 | 0.9861 |
| Hydrogen Consumption (Weight Per cent of Tar Charged) | | 0.49 | 1.41 | 0.39 | 1.06 |
| Gasoline to Gas Ratio | | 2.20:1 | 3.37:1 | 2.01:1 | 2.33:1 |

From other results (run 2, 4) in comparison to those of the thermal run (run 1), it will be noted that the presence of either the molybdenum trioxide-Magnesol catalyst or the molybdenum trioxide-talc decreased the conversion of charge stock to lower-boiling products. Use of either of these catalysts, however, resulted in the obtaining of a higher ratio of gasoline to gas. In addition their use reduced coke formation appreciably and increased hydrogenation reactions, as indicated by the comparative values for hydrogen consumption and for specific gravities of the gas oil and tar fractions. Comparing runs 2 and 4, it will be noted that the hydrogenation activity of the molybdenum trioxide-synthetic calcium silicate-magnesium silicate is considerably better than that of the molybdenum trioxide-talc even though such quantities of each of them were employed to make the amount of molybdenum trioxide available for catalyzing the reaction substantially the same. One reason for this is undoubtedly the fact that the molybdenum trioxide was spread out better on the synthetic calcium silicate-magnesium silicate because the synthetic calcium silicate-magnesium silicate had a substantially greater surface area than the talc. The molybdenum trioxide tended to build up in layers on the talc with only the surface layer being readily available for catalyzing the reaction. Another reason is that the molybdenum trioxide-synthetic calcium silicate-magnesium silicate was less dense than the molybdenum trioxide-talc, and thus it was more easily suspendable in the charge during the reaction. The advantages of synthetic calcium silicate-magnesium silicate over a relatively dense naturally-occurring catalyst carrier having low surface area is thus apparent. The results of run 3 in which synthetic calcium silicate-magnesium silicate alone was tested are quite comparable with those of the thermal run, showing its contribution to the catalytic activity of the molybdenum trioxide-synthetic calcium silicate-magnesium silicate catalyst is small.

Experiments carried out on the regeneration of the catalyst comprising molybdenum trioxide and synthetic calcium silicate-magnesium silicate show that it can be successfully regenerated.

While the amount of molybdenum trioxide deposited on the synthetic calcium silicate-magnesium silicate may be varied, it should be in the range of from about 1 to 30 per cent by weight of the synthetic calcium silicate-magnesium silicate. The amount of catalyst used in destructive hydrogenation may be varied but best results have been attained particularly in the use of the suspensoid type operation mentioned above by the use of an amount of catalyst expressed as a space velocity from 0.2 to 2.0 volumes of catalyst and oil suspension per volume of reaction space per hour, said suspension consisting of from 0.01 to 0.15 lb. catalyst per pound of oil.

During use of the molybdenum trioxide supported catalysts herein disclosed, the trioxide was subjected to partial reduction because of the presence of hydrogen and because of the high temperature employed. Also, sulfur in the stock treated tended to convert the trioxide to sulfides. Thus reduced molybdenum trioxide and sulfides of molybdenum contributed to the activity of the catalysts. For convenience in this specification, however, the catalytic agent is considered to be the trioxide which is substantially the initial form of the molybdenum in the catalysts as prepared and charged. The term "molybdenum oxide" as used in the claims is intended to mean molybdenum trioxide or a partially reduced oxide.

Except for the special adaptability of the catalyst in suspensoid operations described above the catalyst may be used in the usual manner such as at a temperature in the range 800° to 950° F. and an increased pressure such as 1000 to 3000 pounds per square inch.

The catalyst of the present invention not only brings about a high conversion of petroleum residues but is also inexpensive, easily available, non-abrasive, soft and easily suspendable in the heavy petroleum residue.

What we claim is:

1. A process for the destructive hydrogenation of petroleum residues comprising subjecting said residues together with hydrogen and a catalyst comprising a hydrated synthetic magnesium silicate-calcium silicate compound impregnated with molybdenum oxide to a temperature in the range 800° to 950° F. at an increased pressure.

2. A process for the destructive hydrogenation of heavy petroleum residues comprising subjecting said residues together with hydrogen and a catalyst comprising a hydrated synthetic magnesium silicate-calcium silicate compound impregnated with molybdenum oxide to a temperature in the range 800° to 950° F. at an increased pressure and a space velocity of from 0.2 to 2.0 volumes of catalyst and oil suspension per volume of reaction space per hour.

3. A process for the destructive hydrogenation of heavy petroleum residues comprising subjecting said residues together with hydrogen and a catalyst comprising a hydrated synthetic magnesium silicate-calcium silicate compound impregnated with molybdenum oxide to a temperature in the range 800° to 950° F. at an increased pressure and a space velocity of from 0.2 to 2.0 volumes of catalyst and oil suspension per volume of reaction space per hour said suspension consisting of from 0.01 to 0.15 lb. catalyst per lb. of oil.

4. A process for the destructive hydrogenation of heavy petroleum residues comprising subjecting said residues together with hydrogen and a catalyst comprising a hydrated synthetic magnesium silicate-calcium silicate compound impregnated with molybdenum trioxide, said catalyst being suspended in said residue, to a temperature in the range 800° to 950° F. at an increased pressure, separating the reaction products into gas, gasoline and higher boiling hydrocarbons containing catalyst and recycling said higher boiling hydrocarbons containing catalyst to the reactor.

CHARLES W. MONTGOMERY.
JOSEPH BURNS McKINLEY.
VICTOR J. ANHORN.

REFERENCES CITED

The following references are of record in the file of this patent:

UNITED STATES PATENTS

| Number | Name | Date |
| --- | --- | --- |
| 1,657,753 | Jaeger et al. | Jan. 31, 1928 |
| 1,802,628 | Caldwell | Apr. 28, 1931 |
| 2,088,214 | Pfirrmann | July 27, 1937 |
| 2,278,590 | Ruthruff I | Apr. 7, 1942 |
| 2,324,518 | Klein et al. | July 20, 1943 |
| 2,331,338 | Michael et al. | Oct. 12, 1943 |
| 2,333,500 | Welty | Nov. 2, 1943 |
| 2,350,282 | La Lande | May 30, 1944 |
| 2,356,576 | Free et al. | Aug. 20, 1944 |
| 2,390,556 | Ruthruff II | Dec. 11, 1945 |
| 2,406,929 | Teter | Sept. 2, 1946 |